US012651486B2

(12) United States Patent
Yamada et al.

(10) Patent No.: US 12,651,486 B2
(45) Date of Patent: Jun. 9, 2026

(54) INFORMATION PROCESSING DEVICE, VEHICLE, INFORMATION PROCESSING SYSTEM, INFORMATION PROCESSING METHOD, AND NON-TEMPORARY STORAGE MEDIUM

(71) Applicant: TOYOTA JIDOSHA KABUSHIKI KAISHA, Toyota (JP)

(72) Inventors: Yoshihisa Yamada, Nagoya (JP); Shoji Kubota, Nagoya (JP); Masashi Nose, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 18/376,215

(22) Filed: Oct. 3, 2023

(65) Prior Publication Data

US 2024/0119762 A1 Apr. 11, 2024

(30) Foreign Application Priority Data

Oct. 5, 2022 (JP) ................................ 2022-160790

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
None
See application file for complete search history.

(56) References Cited

U.S. PATENT DOCUMENTS

2015/0206355 A1* 7/2015 Hubbard .......... G08G 1/096775 701/1
2018/0074497 A1* 3/2018 Tsuji .................. B60W 50/082
2019/0236957 A1* 8/2019 Hayakawa ........... G08G 1/0133
2023/0150521 A1* 5/2023 Jeon ...................... B60W 10/18 701/70
2023/0162541 A1 5/2023 Yamada et al.
2023/0177950 A1 6/2023 Ueno et al.

FOREIGN PATENT DOCUMENTS

JP 2005222325 A * 8/2005
JP 2010211380 A * 9/2010
JP 2017-215654 A 12/2017
JP 2022-128425 A 9/2022
JP 2023-075502 A 5/2023
JP 2023-082863 A 6/2023
KR 20210008894 A * 1/2021 ............ B60W 10/00

OTHER PUBLICATIONS

Machine translation of JP-2005222325-A (Year: 2005).*
Machine translation of KR-20210008894-A (Year: 2021).*
Machine translation of JP-2010211380-A (Year: 2010).*

* cited by examiner

*Primary Examiner* — Anne Marie Antonucci
*Assistant Examiner* — Kyle S Park
(74) *Attorney, Agent, or Firm* — Oliff PLC

(57) ABSTRACT

An information processing method that is executed by an information processing device configured to calculate a feature relating to driving by a driver and transmit configured to information on the feature to outside includes specifying whether a current situation is a predetermined situation, calculating information on the predetermined situation as the feature when the information processing device specifies the predetermined situation, statistically quantifying the feature, and transmitting the statistically quantified feature to outside.

6 Claims, 4 Drawing Sheets

INFORMATION PROCESSING DEVICE, VEHICLE, INFORMATION PROCESSING SYSTEM, INFORMATION PROCESSING METHOD, AND NON-TEMPORARY STORAGE MEDIUM

CROSS-REFERENCE TO RELATED APPLICATION

This application claims priority to Japanese Patent Application No. 2022-160790 filed on Oct. 5, 2022, incorporated herein by reference in its entirety.

BACKGROUND

1. Technical Field

This present disclosure relates to an information processing device, a vehicle, an information processing system, an information processing method, and a non-temporary storage medium. This disclosure particularly relates to an information processing device that calculates a feature relating to driving by a driver, a vehicle that includes the information processing device, an information processing system that includes the vehicle and a server, an information processing method executed by the information processing device, and a non-temporary storage medium executed by the information processing device

2. Description of Related Art

In recent years, a safe driving assist device was invented (for example, see Japanese Unexamined Patent Application Publication No. 2017-215654) which determines the vehicle speed of subject vehicle, determines the traveling scene of the subject vehicle, determines the line-of-sight state of the driver, decides a determination range using the vehicle speed of the subject vehicle and the traveling scene of the subject vehicle, and decides a determination time using the vehicle speed of the subject vehicle and the traveling scene of the subject vehicle, and further determines whether the time during which the driver's line-of-sight direction is out of the determination range continues for a determination time using the line-of-sight state of the driver, the determination range and determination time that depend on the vehicle speed of the subject vehicle and the traveling scene of the subject vehicle, and then determines whether the driver's driving is distracted.

SUMMARY

In such a device, when data is transmitted from a certain processor in a vehicle, it is necessary to reduce a data amount.

The present disclosure provides an information processing device, a vehicle, an information processing system, an information processing method, and a non-temporary storage medium that are capable of transmitting a feature with a reduced data amount.

An information processing device according to a first aspect of the present disclosure includes a processor and a transmitter. The processor is configured to calculate a feature relating to driving by a driver. The transmitter is configured to transmit information on the feature to outside. The processor is configured to specify whether a current situation is a predetermined situation, calculate information on the predetermined situation as the feature when the processor specifies the predetermined situation, and statistically quantify the feature. The transmitter is configured to transmit the statistically quantified feature to outside.

With the configuration described above, when the processor specifies that the current situation is the predetermined situation, information on the predetermined situation is calculated as the feature, and the feature is statistically quantified, and then the statistically quantified feature is transmitted to the outside. A plurality of features that is statistically quantified typically has lower amount of data than those that are not statistically quantified. As a result, it is possible to provide an information processing device capable of transmitting the feature with a reduced data amount.

In the first aspect, the transmitter may be configured to transmit, to outside, information on the feature and information indicating a time when the feature is calculated. With the configuration described above, it is possible to specify the time when the feature was calculated from the outside.

In the first aspect, the processor may be configured to calculate information on a frequency of a target event in the predetermined situation as the feature. With the configuration described above, information on the frequency of the target event in the predetermined situation can be transmitted to the outside as a feature.

A vehicle according to a second aspect of the present disclosure includes the information processing device.

With the configuration described above, it is possible to provide a vehicle capable of transmitting a feature with a reduced data amount.

An information processing system according to a third aspect of the present disclosure includes the information processing device and a server.

With the configuration described above, it is possible to provide an information processing system capable of transmitting a feature with a reduced data amount.

An information processing method according to a fourth aspect of the present disclosure, that is executed by an information processing device configured to calculate a feature relating to driving by a driver and configured to transmit information on the feature to outside. The information processing method includes specifying whether a current situation is a predetermined situation, calculating information on the predetermined situation as the feature when the information processing device specifies the predetermined situation, statistically quantifying the feature, and transmitting the statistically quantified feature to outside.

With the configuration described above, it is possible to provide an information processing method capable of transmitting a feature with a reduced data amount.

A non-temporary storage medium according to a fifth aspect of the present disclosure, that stores instructions that are executable by one or more processors in an information processing device configured to calculate a feature relating to driving by a driver and configured to transmit information on the feature to outside. The instructions cause the one or more processors to perform following functions. The functions include specifying whether a current situation is a predetermined situation, calculating information on the predetermined situation as the feature when the processor specifies the predetermined situation, statistically quantifying the feature, and transmitting the statistically quantified feature to outside.

With such a configuration, it is possible to provide an information processing method capable of transmitting a feature with a reduced data amount.

With each aspect of the present disclosure, it is possible to provide an information processing device, a vehicle, an information processing system, an information processing method, and a non-temporary storage medium that can reduce a data amount of features and transmit them.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
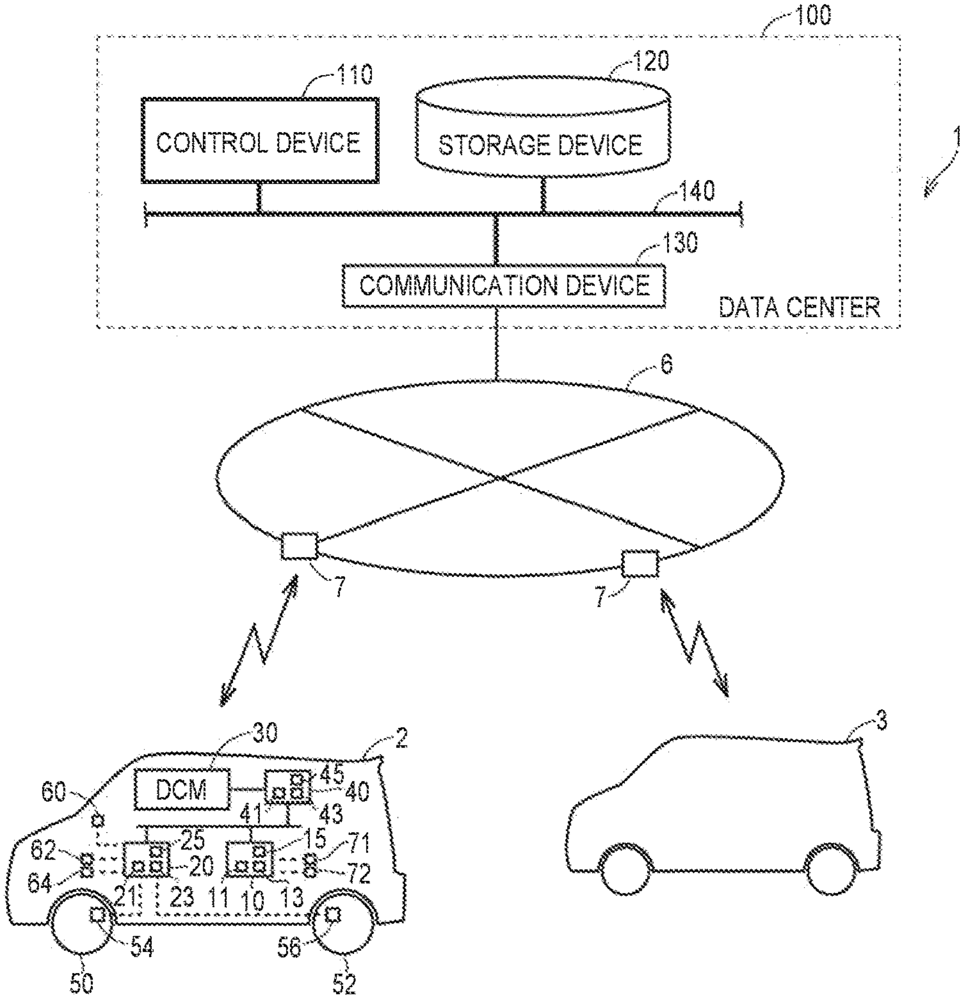
FIG. 1 is a diagram for illustrating an example of a configuration of a vehicle information management system.

Hereinafter, an embodiment of the present disclosure will be described in detail with reference to the drawings. The same or corresponding parts in the drawings are denoted by the same reference numerals, and description thereof will not be repeated.

FIG. 1 is a diagram for illustrating an example of a configuration of a vehicle information management system 1. As illustrated in FIG. 1, the vehicle information management system 1 includes a plurality of vehicles 2, 3, a communication network 6, a base station 7, and a data center 100 in the present embodiment.

The vehicles 2, 3 need only be able to communicate with the data center 100. For example, the vehicles 2, 3 may refer to vehicles using engines as a drive source, electric vehicles using electric motors as a drive source, or hybrid vehicles equipped with both an engine and an electric motor, and utilizing at least one of these as a drive source. In FIG. 1, only two vehicles 2, 3 are illustrated for convenience of explanation, but the number of vehicles is not particularly limited to two, and may be three or more.

The vehicle information management system 1 is configured to acquire predetermined information from the vehicles 2, 3 configured to be able to communicate with the data center 100, and manage the acquired information.

The data center 100 includes a control device 110, a storage device 120, and a communication device 130. The control device 110, the storage device 120, and the communication device 130 are communicably connected to each other via a communication bus 140.

Although neither is shown, the control device 110 includes a central processing unit (CPU), a memory such as a read only memory (ROM) and a random access memory (RAM), an input/output port for inputting and outputting various signals, and the like. Various controls executed by the control device 110 are executed by software processing, that is, a program stored in the memory is read by the CPU. The control device 110 enables various controls, which may be executed by a general-purpose server (not illustrated) running a program stored in a storage medium. However, various controls of the control device 110 are not limited to software processing, and may be processed by dedicated hardware (electronic circuit).

The storage device 120 stores predetermined information regarding the vehicles 2, 3 that are configured to be able to communicate with the data center 100. Predetermined information includes, for example, information relating to features of each of the vehicles 2, 3, which will be described below, and information (hereinafter referred to as a vehicle ID) for specifying the vehicles 2, 3. The vehicle ID is unique information set for each vehicle. The data center 100 can specify a transmission source vehicle by the vehicle ID.

The communication device 130 allows for two-way communication between the control device 110 and the communication network 6. The Data center 100 enables communication with a plurality of vehicles including the vehicles 2, 3 via the base stations 7 provided on the communication network 6 using the communication device 130.

Next, specific configurations of the vehicles 2, 3 will be described. Since the vehicles 2, 3 basically have a common configuration, the configuration of the vehicle 2 will be representatively described below.

The vehicle 2 includes drive wheels 50 and driven wheels 52. When the drive wheels 50 are rotated by an operation of the drive source, a driving force acts on the vehicle 2 and the vehicle 2 travels.

The vehicle 2 further includes an ADAS-electronic control unit (ECU) 10, a brake ECU 20, a data communication module (DCM) 30, and a central ECU 40.

The ADAS-ECU 10 is a computer having a processor such as a CPU 11, that executes a program, a memory 15, and an input/output interface 13. The brake ECU is a computer having a processor (such as a CPU 21) that executes a program, a memory 25, and an input/output interface 23. The central ECU 40 is a computer having a processor (such as a CPU 41) that executes a program, a memory 45, and an input/output interface 43.

The ADAS-ECU 10 includes a driving assist system having functions relating to driving assist for the vehicle 2. The driving assist system is configured to, by executing the application to be implemented, enable various functions for assisting driving the vehicle 2 including at least one of steering control, drive control, and braking control of the vehicle 2. Applications implemented in the driving assist system include, for example, applications that realize the functions of an autonomous driving system (AD), applications that enable the functions of an automatic parking system, applications that enable the functions of an advanced driver assistance system (ADAS), and the like.

The ADAS applications include at least one of an application such as adaptive cruise control (ACC) that allows the vehicle for following the preceding vehicle at a constant distance, an application that enables an auto speed limiter (ASL) function that recognizes a vehicle speed limit and maintains an upper speed limit of a vehicle being by a driver, an application such as lane keeping assist (LKA) or lane tracing assist (LTA) that enables a function of lane keeping assistance that allows the vehicle to maintains traveling in the same lane, an application such as autonomous emergency braking (AEB) or pre-crash safety (PCS) that enables a collision damage mitigation braking function that automatically applies braking to reduce collision damage, and an application such as lane departure warning (LDW) or lane departure alert (LDA) that enables a lane departure warning function that warns the vehicle 2 of the lane departure.

Based on information on the surrounding status of a vehicle and driver assistance requests acquired (input) from a plurality of sensors, each application of this driving assist system outputs to the brake ECU 20 an action plan request that secures the marketability (function) of the application alone. The sensors include, for example, a vision sensor such as a front facing camera 71, a millimeter wave radar 72, a light detection and ranging (LiDAR), or a position detection device.

The front facing camera 71 captures an image in front of the vehicle 2 and transmits data of the captured image to the ADAS-ECU 10. The millimeter wave radar 72 is a sensor that measures the distance, speed, and angle of a target object in the surroundings of the vehicle 2 such as the front of the vehicle 2 using radio waves in the millimeter wave band (30 GHz band to 300 GHz band), and transmits measurement result data to the ADAS-ECU 10. However, the sensors connected to the ADAS-ECU 10 is not limited to being connected to the ADAS-ECU 10, and either sensor may be connected to another ECU and the data of the detection result of that sensor may be input to the ADAS-ECU 10 via the communication bus or the central ECU 40.

Each application acquires information on the surrounding status of a vehicle that integrates the detection results of one or more sensors as information from the recognition sensor, and also acquires a driver's assistance request via a user interface (not illustrated) such as a switch. For example, through the image processing capabilities using image processors or artificial intelligence (AI) algorithms, each application is able to analyze images and videos around the vehicle captured by a range of the sensors, enabling the application to identify other vehicles, obstacles, and pedestrians in its vicinity. For example, using data from the front facing camera 71 and the millimeter wave radar 72, the inter-vehicle time is calculated from the inter-vehicle distance and the relative speed between the vehicle 2 and the preceding vehicle by the following formula: inter-vehicle distance/relative speed=inter-vehicle time.

Further, the action plan includes, for example, a request regarding the longitudinal acceleration/deceleration to be generated in the vehicle 2, a request regarding the steering angle of the vehicle 2, or a request regarding holding of the vehicle 2 at a stop.

The brake ECU 20 controls a brake actuator that generates a braking force on the vehicle 2 using detection results from the sensors. Further, the brake ECU 20 sets a driving request of the vehicle 2 for allowing for the action plan request from the ADAS-ECU 10. Driving requests of the vehicle 2 set in the brake ECU 20 are allowed by an actuator system (not illustrated) provided in the vehicle 2. The actuator system includes, for example, a plurality of types of actuator systems such as a powertrain system, a braking system, and a steering system.

A steering angle sensor 60, an accelerator pedal depression degree sensor 62, a brake pedal depression degree sensor 64, a first wheel speed sensor 54, and a second wheel speed sensor 56 are connected to the brake ECU 20, for example.

The steering angle sensor 60 detects the steering angle. The steering angle sensor 60 transmits a signal indicating the detected steering angle to the brake ECU 20.

The accelerator pedal depression degree sensor 62 detects the degree of depression of an accelerator pedal (not illustrated). The accelerator pedal depression degree sensor 62 transmits a signal indicating the detected degree of depression of the accelerator pedal to the brake ECU 20.

The brake pedal depression degree sensor 64 detects the degree of depression of a brake pedal (not illustrated). The brake pedal depression degree sensor 64 transmits a signal indicating the detected degree of depression of the brake pedal to the brake ECU 20.

The first wheel speed sensor 54 detects the rotation speed (wheel speed) of the drive wheel 50. The first wheel speed sensor 54 transmits a signal indicating the detected rotation speed of the drive wheel 50 to the brake ECU 20.

The second wheel speed sensor 56 detects the rotation speed of the driven wheel 52. The second wheel speed sensor 56 transmits a signal indicating the detected rotation speed of the driven wheel 52 to the brake ECU 20.

In addition, in FIG. 1, the configuration in which the steering angle sensor 60, the accelerator pedal depression degree sensor 62, the brake pedal depression degree sensor 64, the first wheel speed sensor 54, and the second wheel speed sensor 56 are connected to the brake ECU 20 and in which the detection results are directly transmitted to the brake ECU 20 is illustrated as an example. However, some of the sensors may be connected to another ECU and the detection results may be input to the brake ECU 20 via the communication bus or the central ECU 40.

Further, the brake ECU 20 receives, for example, in addition to the information on the action plan from the ADAS-ECU 10, information on operating states of various applications, information on other driving operations such as a shift range, and information on the behavior of the vehicle 2.

The DCM 30 is a communication module configured to enable two-way communication with the data center 100.

The central ECU 40 is, for example, configured to be communicable with the brake ECU 20 and is configured to be communicable with the data center 100 using the DCM 30. The central ECU 40, for example, transmits information received from the brake ECU 20 to the data center 100 via the DCM 30.

In the present embodiment, the central ECU 40 is described as transmitting information received from the brake ECU 20 to the data center 100 via the DCM 30. However, for example, the central ECU 40 may have a function (gateway function) such as relaying communication between various ECUs. Alternatively, the central ECU 40 may include a memory (not illustrated) of which the stored content can be updated with update information from the data center 100, and predetermined information including the update information stored in the memory may be read out from various ECUs when the system of the vehicle 2 is started.

In the vehicle 2 having the above configuration, it is conceivable to determine the vehicle speed of a subject vehicle, determine the traveling scene of the subject vehicle, determine the line-of-sight state of the driver, decide a determination range using the vehicle speed of the subject vehicle and the traveling scene of the subject vehicle, and decide a determination time using the vehicle speed of the subject vehicle and the traveling scene of the subject vehicle, and further determine whether the time during which the driver's line-of-sight direction is out of the determination range continues for a determination time using the line-of-sight state of the driver, the determination range and determination time depending on the vehicle speed of the subject vehicle and the traveling scene of the subject vehicle, and then determine whether the driver's driving is distracted.

In this case, when data is transmitted from the ECU that performs the above processing, it is required to reduce the amount of data.

Therefore, the brake ECU 20 specifies whether a current situation is a predetermined situation, and when the brake ECU 20 specifies that the current situation is the predetermined situation, the brake ECU 20 calculates information on the predetermined situation as a feature, statistically quantifies the feature, and transmits the statistically quantified feature to the outside.

A plurality of features that is statistically quantified typically has lower amount of data than those that are not statistically quantified. As a result, it is possible to reduce the data amount of features and transmit them.

Figure 2:
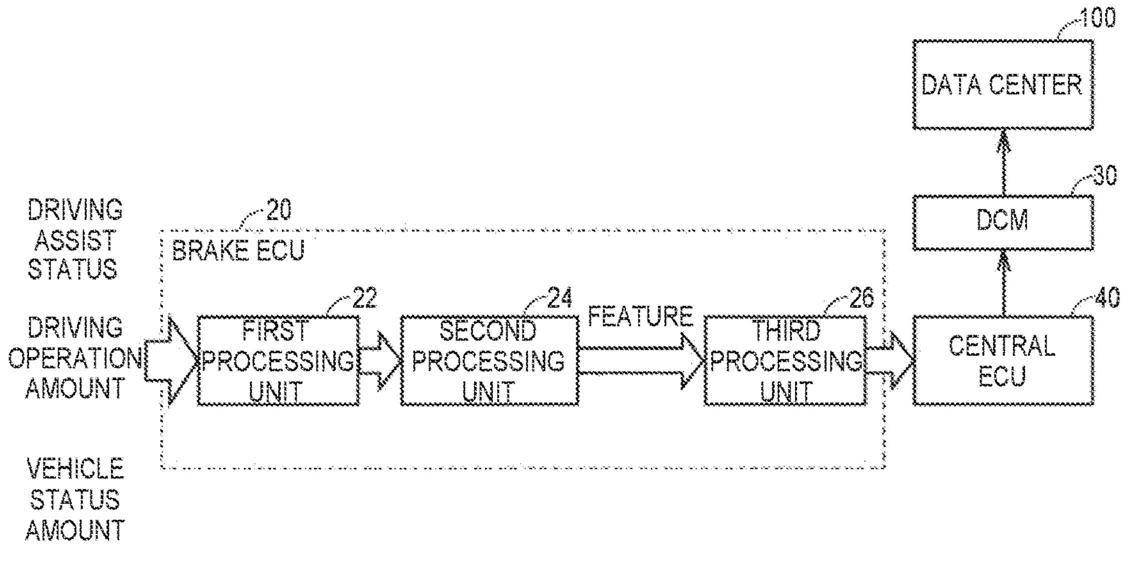
FIG. 2 is a diagram for illustrating a configuration of an example of a vehicle information processing device according to a present embodiment.

FIG. 2 is a diagram for illustrating a configuration of an example of a vehicle information processing device according to the present embodiment. The vehicle information processing device according to the present embodiment is implemented through the brake ECU 20.

The brake ECU 20 includes a first processing unit 22, a second processing unit 24, and a third processing unit 26. The first processing unit 22, the second processing unit 24, and the third processing unit 26 are virtually configured inside the brake ECU 20 by a cooperative operation of the CPU 21, the memory 25, and the input/output interface 23 of the brake ECU 20.

The first processing unit 22 receives information indicating the degree of depression of the accelerator pedal and information indicating the degree of depression of the brake pedal as information regarding the driving operation of the vehicle 2. Further, the first processing unit 22 receives a request for the action plan from the ADAS-ECU 10 and information indicating an operating state of the driving assist system as information on the operating state of the driving assist of the vehicle 2. Further, the first processing unit 22 receives information indicating detection results from various sensors as information on the behavior of the vehicle 2. The first processing unit 22 outputs received input information to the second processing unit 24 during a specific time window when a predetermined condition is satisfied. This time window corresponds to the period when the input information is being received.

The second processing unit 24 calculates a feature relating to the operation of the vehicle 2 using the received input information during a specific time window when a predetermined condition is satisfied. This time windows corresponds to the period when the input information is being received.

Figure 3:
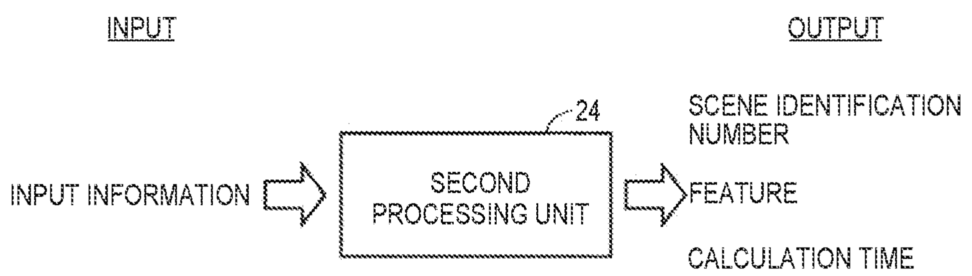
FIG. 3 is a diagram for illustrating an example of processing executed in a second processing unit.

FIG. 3 is a diagram for illustrating an example of processing executed in the second processing unit 24. As illustrated in FIG. 3, during a specific time window when a predetermined condition is satisfied, the second processing unit 24 receives input information. This time windows corresponds to the period when the input information is being received. The second processing unit 24 uses these pieces of input information to determine whether the predetermined condition is satisfied.

The predetermined conditions include a condition that the driving situation of the vehicle 2 is a predetermined driving situation corresponding to the feature. The predetermined condition is set in advance based on the calculated feature.

The second processing unit 24 turns on a satisfaction flag when the second processing unit 24 determines that the predetermined condition is satisfied. The second processing unit 24 outputs a signal indicating the state of the satisfaction flag as a scene identification signal.

Further, when the second processing unit 24 determines that the predetermined condition is satisfied, the second processing unit 24 calculates a feature regarding the operation of the vehicle 2 using the input information received during the period in which the predetermined condition is satisfied. The second processing unit 24 calculates a feature, for example, when the predetermined condition is satisfied, and stores (saves) the calculated feature in a memory 25 in association with time. The second processing unit 24 outputs the calculated feature together with the scene identification signal and the calculation time.

The third processing unit 26 uses the information output from the second processing unit 24 to perform preprocessing (for example, processing to generate information on changes in the vehicle 2) for transmitting information to the central ECU via controller area network (CAN). As preprocessing, the third processing unit 26 executes anonymization of feature such as statistical processing and identifies any changes, such as deviations from previous trips or sudden changes, in features. For example, information on changes in the vehicle 2 is generated using information output from the second processing unit 24 when the satisfaction flag included in the scene identification signal is in a predetermined state (for example, ON state).

Figure 4:
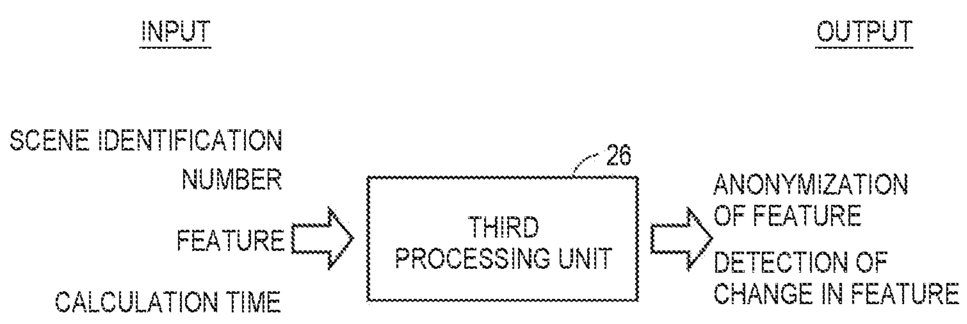
FIG. 4 is a diagram for illustrating an example of processing executed in a third processing unit.

FIG. 4 is a diagram for illustrating an example of processing executed in the third processing unit 26. As illustrated in FIG. 4, the third processing unit 26 receives information indicating the scene identification signal, the feature, and the calculation time from the second processing unit 24.

The third processing unit 26 outputs information necessary for determining whether the change history of the feature corresponds to a predetermined state at the data center 100. The third processing unit 26 outputs the generated information to the central ECU 40.

The central ECU 40 transmits information input from the third processing unit 26 to the data center 100 via the DCM 30.

Information transmitted from the DCM 30 to the data center 100 includes, for example, the processing time, the scene identification number, and the feature (there is a plurality of sets of scene identification numbers and features). Therefore, the data center 100 stores pieces of the information input from the DCM 30 in the storage device 120 as sets of data. As a result, the data center 100 can acquire statistics about changes in features of each of the vehicles 2, 3 that can communicate with the data center 100 and statistics about changes in the driver's driving behavior characteristics of each of the vehicles 2, 3.

Figure 5:
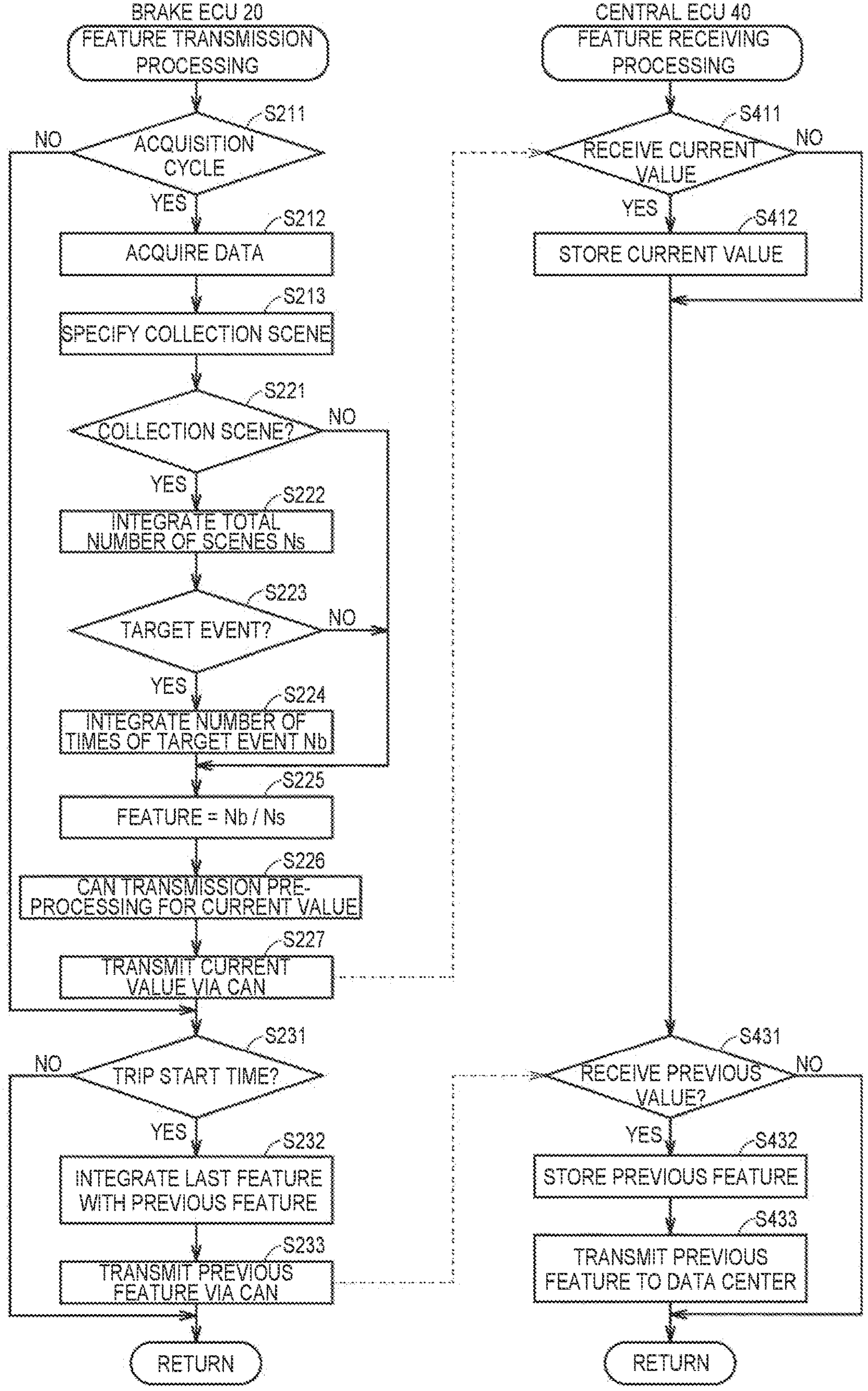
FIG. 5 is a flowchart illustrating a flow of processing relating to a feature executed by a brake ECU and a central ECU.

FIG. 5 is a flowchart illustrating a flow of processing relating to a feature executed by the brake ECU 20 and the central ECU 40. Referring to FIG. 5, feature transmission processing executed by the brake ECU 20 is requested and executed at predetermined control cycles from higher-level processes. Feature receiving processing executed by the central ECU 40 is requested and executed at predetermined control cycles from higher-level processes.

First, the CPU 21 of the brake ECU 20 determines whether it is a data acquisition cycle (a relatively short cycle, such as every 1000 ms) for calculating the feature (step S211). When determining that it is not the data acquisition cycle (NO in step S211), the CPU 21 advances the process to be executed to the process of step S231.

On the other hand, when the CPU 21 determines that it is the data acquisition cycle (YES in step S211), the CPU 21 acquires data for calculating the feature from the ADAS-ECU 10 or the like (step S212). Next, the CPU 21 specifies a collection scene from the acquired data (step S213). Examples of the collection scene includes (1) a scene in which a distance between the subject vehicle and a preceding vehicle has changed by a predetermined amount that allows a prediction that the behavior of the driver will reduce the risk with the preceding vehicle, (2) a scene in which tire-related values (for example, the absolute value of the angular velocity of a steering wheel, the absolute value of the vector sum of vehicle accelerations) have changed, (3) a scene in which the steering angle and acceleration of the vehicle 2 have changed, (4) a scene in which the accelerator pedal and the brake pedal are operated by the driver, and (5) a scene in which the wheel speed of the vehicle 2 has changed.

Then, the CPU 21 determines whether the current situation is the predetermined collection scene (step S221). When determining that the current situation is not the predetermined scene (NO in step S221), the CPU 21 advances the process to be executed to the process of step S225.

On the other hand, when the CPU 21 determines that it is the predetermined collection scene (YES in step S221), the CPU 21 integrates a total number of scenes Ns, that is, adds 1 to the original Ns and sets it as a new Ns (step S222).

Next, the CPU 21 determines whether a target event has occurred (step S223). (1) When the collection scene is the scene in which the distance between the subject vehicle and the preceding vehicle has changed by a predetermined amount that allows the prediction that the behavior of the driver will reduce the risk with the preceding vehicle, the target event is an event that a driver's behavior that reduces the risk was performed in such a scene. (2) When the collection scene is the scene in which tire-related values (for example, the absolute value of the angular velocity of the steering wheel, the absolute value of the vector sum of vehicle accelerations) have changed, the target event is an event that satisfies a predetermined criterion for determining that the status of the tire has changed. (3) When the collection scene is the scene in which the steering angle and acceleration of the vehicle 2 have changed, the target event is an event that satisfies a predetermined criterion for determining that the slip ratio of the drive wheel has changed. (4) When the collection scene is the scene in which the accelerator pedal and the brake pedal are operated by the driver, the target event is an event that satisfies a predetermined criterion for determining a driver's proficiency level. (5) When the collection scene is the scene in which the wheel speed of the vehicle 2 has changed, the target event is an event that satisfies a predetermined criterion for determining that the vehicle is traveling on a motorway. When the CPU 21 determines that the target event has not occurred (NO in step S223), the CPU 21 advances the process to be executed to the process of step S225.

On the other hand, when the CPU 21 determines that the target event has occurred (YES in step S223), the CPU 21 integrates the number of times Nb of occurrence of the target event, that is, adds 1 to the original Nb to obtain a new Nb (step S224).

Next, the CPU 21 calculates feature=Nb/Ns (step S225). The CPU 21 executes anonymization of the feature, such as statistical processing as CAN transmission pre-processing for the current value of the feature (step S226). Calculating a frequency such as Nb/Ns is also statistical processing and is included in anonymization. The CPU 21 transmits the anonymized feature to the central ECU 40 by CAN (step S227).

Figure 6:
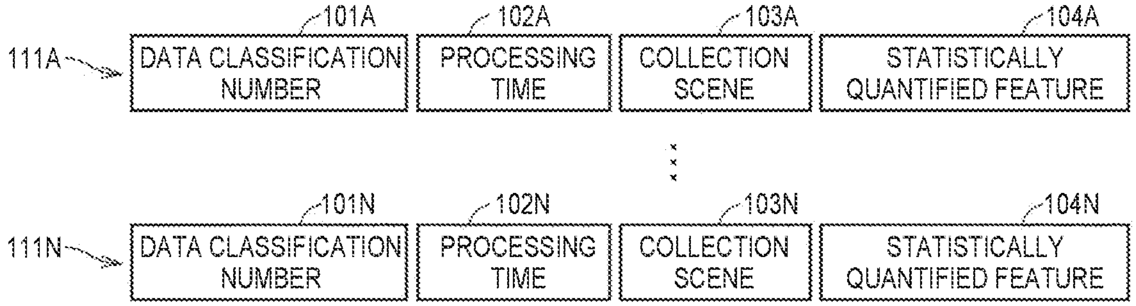
FIG. 6 is a diagram for illustrating data transmitted via CAN.

FIG. 6 is a diagram for illustrating data transmitted via CAN. With reference to FIG. 6, transmission data frames 111A to 111N transmitted to the central ECU each include each piece of data of data classification numbers 101A to 101N, processing times 102A to 102N, collection scenes 103A to 103N, and statistically quantified features 104A to 104N.

The data classification numbers 101A to 101N include data used to classify the types of data found in the transmission data frames 111A to 111N, with each number representing a specific classification such as vehicle control or notification on a user interface. FIG. 6 shows that the data classification numbers 101A to 101N, with each number representing a specific classification that includes a feature to be statistically quantified in each collection scene, are set.

The processing times 102A to 102N each include data representing times when the features found in the transmission data frames 111A to 111N were calculated. The collection scenes 103A to 103N each include data representing the numbers used to classify the collection scenes of the features found in the transmission data frames 111A to 111N. The statistically quantified features 104A to 104N each include data representing the statistically quantified features.

Returning to FIG. 5, the CPU 41 of the central ECU 40 determines whether the transmission data frames 111A to 111N of the features of the current values have been received from the brake ECU 20 (step S411). When the CPU 41 determines that the current values have been received (YES in step S411), the pieces of the data of the transmission data frames 111A to 111N of the received current values are stored in the memory 45 (step S412).

The CPU 21 of the brake ECU 20 determines whether it is the operation start time (the trip start time) of the vehicle 2 (step S231). When determining that it is not the trip start time (NO in step S231), the CPU 21 returns the process to be executed to the higher-level process that requested this feature transmission processing.

On the other hand, when the CPU 21 determines that it is the trip start time (YES in step S231), the value of the last feature Nb/Ns in the last trip is added to the integrated value ΣNb/ΣNs of the previous features (step S232), and then the integrated value ΣNb/ΣNs of the previous features is transmitted to the central ECU 40 via CAN (step S233). The transmission data frame in this case is as described in FIG. 6.

The CPU 41 of the central ECU 40 determines whether the integrated value ΣNb/ΣNs of the previous features has been received from the brake ECU 20 (step S431). When determining that the previous value has not been received (NO in step S431), the CPU 41 returns the process to be executed to the higher-level process that requested this feature receiving processing.

On the other hand, when determining that the previous value has been received (YES in step S431), the CPU 41 stores the received data on the previous value in the memory 45 (step S432) and transmits it to the data center 100 (step S433). Then, the CPU 41 returns the process to be executed to the higher-level process that requested this feature receiving processing.

Figure 7:
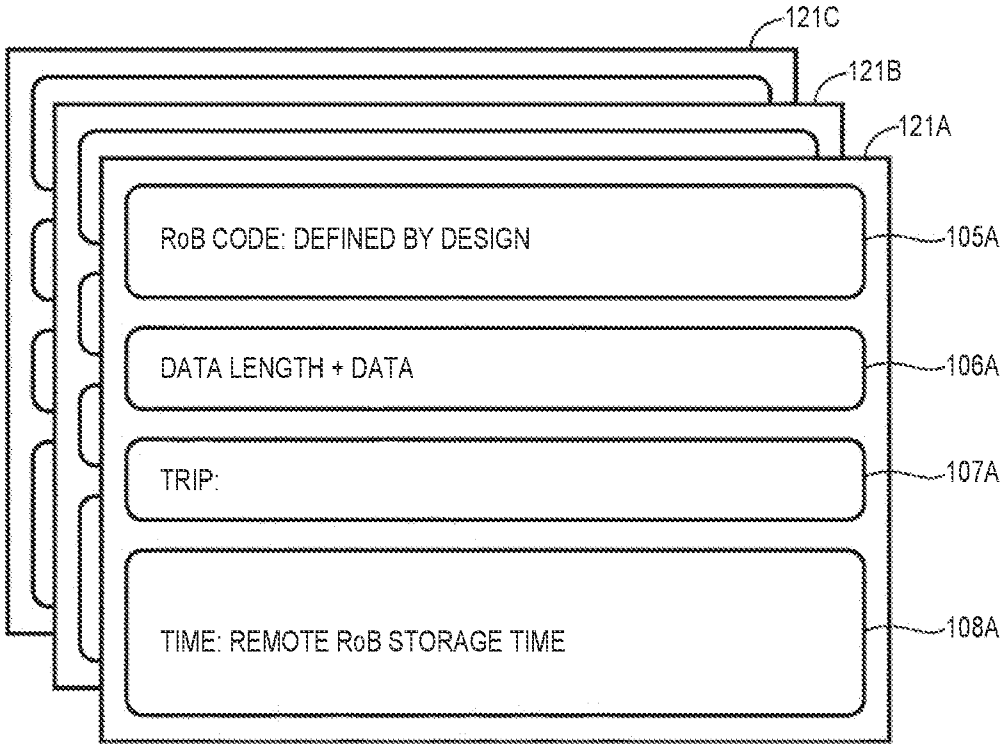
FIG. 7 is a diagram for illustrating data transmitted to a data center.

FIG. 7 is a diagram for illustrating data transmitted to the data center 100. Referring to FIG. 7, data transmitted to the data center 100 is transmitted using a record of behavior (RoB) mechanism. RoB is a system of storing anomalies in a system of the vehicle 2 and transmitting them to the outside such as the data center 100.

Pieces of RoB data 121A to 121C transmitted and stored in the RoB each include RoB codes 105A to 105C, which are defined in the design and indicate the type of this data, data lengths+data 106A to 106C that are targets found in the pieces of the RoB data 121A to 121C, trips 107A to 107C (accumulated travel distance after manufacture of the vehicle 2) where these pieces of data were generated, and times 108A to 108C when these pieces of data were generated.

In this embodiment, the RoB codes 105A to 105C each include data representing numbers used to classify the types of data found in the RoB data 121A to 121C. In this embodiment, the codes are set to indicate that the pieces of the RoB data 121A to 121C are data types including features to be statistically quantified in a respective collection scene.

In this embodiment, the data lengths+data 106A to 106C include collection scene data, feature data, and the total data lengths of these data. The trips 107A to 107C where these pieces of data are generated include the trips where these pieces of RoB data 121A to 121C were created. The times 108A to 108C when these pieces of data were generated include data indicating the times at which the features were calculated.

Modification Example

In the above-described embodiment, statistical processing (anonymization) is executed by calculating the frequency Nb/Ns. However, it is not limited to this, and anonymization can be achieved through the use of other types of statistical processing such as calculation of average value, calculation of minimum value, calculation of maximum value, and calculation of standard deviation. Further, anonymization can be achieved through the use of calculating a feature that has undergone sudden changes or calculating a feature that has undergone gradual changes.

In the embodiment described above, as illustrated in step S231 of FIG. 5, the previous feature is transmitted at the start of the trip. However, it is not limited to this, and may be transmitted at other timings, for example, at the end of the trip or after a predetermined time (for example, several minutes such as five minutes) from the start of the trip.

In the embodiment described above, the vehicle 2 includes the central ECU 40 as illustrated in FIG. 1. However, it is not limited to this, and the central ECU 40 may not be included. In this case, the pieces of the RoB data 121A to 121C illustrated in FIG. 7 are generated in the brake ECU 20 and then transmitted to the data center 100.

In the embodiment described above, the brake ECU 20 executes the processing of FIG. 5. However, it is not limited to this, and the processing of FIG. 5 may be executed by another information processing device, for example, another ECU of the vehicle 2 or an external information processing device (for example, the data center 100).

The embodiment described above can be regarded as disclosure of an information processing device such as the brake ECU 20, disclosure of the vehicles 2, 3 including the information processing device, disclosure of an information processing system such as the vehicle information management system 1, which includes the vehicles 2, 3 and a server such as the data center 100, disclosure of an information processing method executed by the information processing device, or disclosure of an information processing program or a non-temporary storage medium executed by the information processing device.

SUMMARY

As illustrated in FIG. 1, the brake ECU 20 is an information processing device that calculates features relating to driving by the driver, and includes the CPU 21 that calculates the features and the input/output interface 23 that transmits information on the calculated features to the outside. As illustrated in FIGS. 2 to 7, the CPU 21 specifies whether the current situation is a predetermined situation such as the collection scene (for example, steps S213 and S221), and then when the CPU 21 specifies that the current situation is the predetermined situation, information on the predetermined situation is calculated as a feature (for example, steps S222 to S225), and the feature is statistically quantified (for example, steps S225 and S232). The input/output interface 23 transmits the statistically quantified feature to the outside (for example, steps S227 and S233).

As a result, when the processor specifies that the current situation is the predetermined situation, information on the predetermined situation is calculated as the feature, and the feature is statistically quantified, and then the statistically quantified feature is transmitted to the outside. Features that are statistically quantified typically have lower amount of data than those that are not statistically quantified. As a result, it is possible to reduce the data amount of the feature and transmit it.

As illustrated in FIGS. 5 and 6, the input/output interface 23 transmits, to the outside, information indicating the time when the feature was calculated together with the information on the feature (for example, steps S227 and S233). This makes it possible to specify the time when the feature was calculated from the outside.

As illustrated in FIG. 5, the CPU 21 calculates information on the frequency of the target event in the predetermined situation as the feature (for example, step S225). As a result, the information on the frequency of the target event in the predetermined situation can be transmitted to the outside as a feature.

The embodiment of the present disclosure should be considered as an example and not restrictive in all respects. The scope of the present disclosure is indicated by the scope of the claims rather than the description of the above-described embodiment, and is intended to include all modifications within the scope and meaning equivalent to the scope of the claims.

What is claimed is:

1. An information processing device comprising:

a first electronic control unit configured to calculate a feature relating to driving of a vehicle by a driver of the vehicle; and a transmitter configured to transmit information on the feature to outside of the vehicle via a communication network, wherein the first electronic control unit is configured to receive, from an Advanced Driver Assistance System (ADAS) electronic control unit of the vehicle, which is different from the first electronic control unit, a plurality of driving plans set respectively by a plurality of ADAS applications included in the ADAS electronic control unit, set, based on the plurality of driving plans, driving requests to be executed by a plurality of actuator systems provided in the vehicle, control one of the plurality of actuator systems based on the driving requests, determine whether a current situation relating to travelling of the vehicle is a predetermined collection scene in which the feature is to be collected, the predetermined collection scene being a situation in which a target driving event relating to the driving of the vehicle by the driver is to be evaluated, determine, when the current situation is determined to be the predetermined collection scene, whether the driver has performed an event corresponding to the target drying event during the current situation, calculate information including a total number of times that the predetermined collection scene has occurred and a total number of times that the driver performed the event corresponding to the target driving event during the occurrences of the predetermined collection scene as the feature when the first electronic control unit determines that the current situation relating to travelling of the vehicle is the predetermined collection scene, and statistically quantify the feature to obtain a statistical value representing a relationship between the total number of times that the predetermined collection scene has occurred and the total number of times that the driver performed the event corresponding to the target driving event during the occurrences of the predetermined collection scene, the statistical value having an amount of data that is less than an amount of data collected on the feature, and the transmitter is configured to transmit the statistical value to the outside of the vehicle via the communication network without transmitting the data on the feature that has not been statistically quantified.

2. The information processing device according to claim 1, wherein the transmitter is configured to transmit, to the outside of the vehicle, the statistical value and information indicating a time when the statistical value was calculated.

3. The vehicle that includes the information processing device according to claim 1.

4. An information processing system comprising:

the information processing device according to claim 1; and a server that receives the statistical value transmitted to the outside of the vehicle via the communication network.

5. An information processing method that is executed by an information processing device having a first electronic control unit configured to calculate a feature relating to driving of a vehicle by a driver of the vehicle and a transmitter configured to transmit information on the feature to outside of the vehicle via a communication network, the information processing method comprising:

the first electronic control unit receiving, from an Advanced Driver Assistance System (ADAS) electronic control unit of the vehicle, which is different from the first electronic control unit, a plurality of driving plans set respectively by a plurality of ADAS applications included in the ADAS electronic control unit;

the first electronic control unit setting, based on the plurality of driving plans, driving requests to be executed by a plurality of actuator systems provided in the vehicle;

the first electronic control unit controlling one of the plurality of actuator systems based on the driving requests;

the first electronic control unit determining whether a current situation relating to travelling of the vehicle is a predetermined collection scene in which the feature is to be collected, the predetermined collection scene being a situation in which a target driving event relating to the driving of the vehicle by the driver is to be evaluated;

the first electronic control unit determining, when the current situation is determined to be the predetermined collection scene, whether the driver has performed an event corresponding to the target driving event during the current situation;

the first electronic control unit calculating information including a total number of times that the predetermined collection scene has occurred and a total number of times that the driver performed the event corresponding to the target driving event during the occurrences of the predetermined collection scene as the feature when the first electronic control unit determines that the current situation relating to travelling of the vehicle is the predetermined collection scene;

the first electronic control unit statistically quantifying the feature to obtain a statistical value representing a relationship between the total number of times that the predetermined collection scene has occurred and the total number of times that the driver performed the event corresponding to the target driving event during the occurrences of the predetermined collection scene, the statistical value having an amount of data that is less than an amount of data collected on the feature; and the transmitter transmitting the statistical value to the outside of the vehicle via the communication network without transmitting the data on the feature that has not been statistically quantified.

6. A non-transitory storage medium that stores instructions that are executable by one or more electronic control units in an information processing device having a first electronic control unit configured to calculate a feature relating to driving of a vehicle by a driver of the vehicle and a transmitter configured to transmit information on the feature to outside of the vehicle via a communication network, the instructions causing:

the first electronic control unit to receive, from an Advanced Driver Assistance System (ADAS) electronic control unit of the vehicle, which is different from the first electronic control unit, a plurality of driving plans set respectively by a plurality of ADAS applications included in the ADAS electronic control unit;

the first electronic control unit to set, based on the plurality of driving plans, driving requests to be executed by a plurality of actuator systems provided in the vehicle;

the first electronic control unit to control one of the plurality of actuator systems based on the driving requests;

the first electronic control unit to determine whether a current situation relating to travelling of the vehicle is a predetermined collection scene in which the feature is to be collected, the predetermined collection scene being a situation in which a target driving event relating to the driving of the vehicle by the driver is to be evaluated;

the first electronic control unit to determine, when the current situation is determined to be the predetermined collection scene, whether the driver has performed an event corresponding to the target driving event during the current situation;

the first electronic control unit to calculate information including a total number of times that the predetermined collection scene has occurred and a total number of times that the driver performed the event corresponding to the target driving event during the occurrences of the predetermined collection scene as the feature when the first electronic control unit determines that the current situation relating to travelling of the vehicle is the predetermined collection scene;

the first electronic control unit to statistically quantify the feature to obtain a statistical value representing a relationship between the total number of times that the predetermined collection scene has occurred and the total number of times that the driver performed the event corresponding to the target driving event during the occurrences of the predetermined collection scene, the statistical value having an amount of data that is less than an amount of data collected on the feature; and the transmitter to transmit the statistical value to the outside of the vehicle via the communication network without transmitting the data on the feature that has not been statistically quantified.

* * * * *